United States Patent Office 3,207,701
Patented Sept. 21, 1965

3,207,701
PREPARATION OF ALUMINOSILICATE MOLECULAR SIEVE-SILICA GEL COMPOSITES
John R. Curtin, Glassboro, N.J., assignor to Socony Mobil Oil Company, Inc., a corporation of New York
No Drawing. Filed July 12, 1961, Ser. No. 123,420
9 Claims. (Cl. 252—451)

This invention relates to an improved solid contact material and to preparation thereof. More particularly, the present invention is concerned with the production of composited aggregates comprising a major portion of a crystalline aluminosilicate molecular sieve and a minor portion of silica gel binder prepared in a specified manner to yield a resulting hard attrition resistant product.

Molecular sieve materials, as is well known, are composed of crystalline metal aluminosilicates, which have been heated to remove their water of hydration. The crystals obtained upon dehydration are unusually porous, the pores having highly uniform molecular dimensions, generally between about 4 and about 15 angstrom units in diameter. Each crystal of molecular sieve material contains literally billions of tiny cavities or cages interconnected by channels of unvarying diameter. The size and portion of the metal ions in the crystal control the effective diameter of the interconnecting channels. Preparation of these molecular sieves is well known, having been described in the literature, for example in U.S. 2,882,243 and U.S. 2,882,244.

Such sieves, while useful for separating compounds of a given molecular diameter out of mixtures containing other compounds of larger molecular diameter, are inherently characterized by being soft and friable. It has heretofore been proposed to form these sieves into larger particles by using up to 20 percent by weight of a binder material, such as clay. The resulting product, while harder than the clay-free sieve, leaves much to be desired in attaining the physical hardness ordinarily desired in bringing the sieve into contact with fluid mixtures to accomplish separation or other treatment thereof. It has also been proposed to prepare composites of molecular sieves with gelatinous aluminum hydroxide to produce a product characterized by a hardness greater than that of the sieve. Such procedure has, however, had the disadvantage of being limited to preparation of composites in which the content of molecular sieve does not exceed 65 percent by weight.

In accordance with the present invention, it has now been discovered that hard attrition resistant composites of crystalline alumino silicate molecular sieves can be prepared by admixing the same in amounts up to 90 percent by weight of the ultimate composite with a silica gel binder resulting from formation and removal of water from a highly alkaline silica hydrogel which has undergone contact with a water-soluble alkali metal salt prior to said removal of water therefrom.

In one embodiment, the present invention affords a method for producing a molecular sieve composite by combining the sieve with a silica gel binder prepared by reaction of an alkali metal silicate with an acid and a water-soluble alkali metal salt to form a siliceous hydrosol characterized by an alkalinity, expressed as the mol ratio of unneutralized alkali metal hydroxide to silica of between 0.3 and 0.7; an alkali metal salt concentration of between about 0.3 and about 3 gram equivalents per liter and a silica concentration of between about 50 and about 300 grams $SiO_2$ per liter of hydrosol. The resulting siliceous hydrosol containing finely divided solid molecular sieve distributed therein sets, after an interval of time to a hydrogel composite from which water is subsequently removed at a temperature not exceeding 1000° F. to yield a hard aggregate product.

In another embodiment, there is provided a method for producing a molecular sieve composite by combining the sieve with a silica gel binder prepared by reaction of an alkali metal silicate with an acid to form a siliceous hydrosol characterized by an alkalinity, expressed as the mol ratio of unneutralized alkali metal hydroxide to silica of between 0.3 and 0.7 and a silica concentration of between about 50 and about 300 grams $SiO_2$ per liter of hydrosol. The resulting siliceous hydrosol containing finely divided solid molecular sieve distributed therein sets, after an interval of time, to a hydrogel composite, which is aged in an aqueous solution of a water-soluble alkali metal salt containing between about 0.3 and about 3 gram equivalent per liter for a period of between about 1 and about 24 hours at a temperature between about 32 and about 200° F. and thereafter dried and calcined at a temperature not exceeding 1000° F.

The molecular sieve material may be either naturally occuring molecular sieve such as chabazite, analcite, gmelinite, and mordenite or synthetically prepared including the A type, X type, Y type or other well known form of molecular sieve. As initially prepared, the metal of the aluminosilicate is an alkali metal and usually sodium. Such alkali metal is subject to base exchange with a wide variety of other metal ions, including by way of example, calcium, magnesium, silver, copper, mercury, cadmium, nickel, gold, cobalt, zinc, strontium, platinum, and the rare earths including cerium, lanthanum, neodymium, praseodymium and samarium separately or in combination. Sodium and calcium crystalline aluminosilicates of the molecular sieve type are vailable commercially and will ordinarily be composited in finely divided form to yield an aggregate with silica gel prepared in the manner described herein. It is, however, within the purview of the invention to utilize a molecular sieve material in which the metal ion has been replaced by a hydrogen ion or wherein the metal ion is other than a sodium or calcium ion, providing that such ion does not adversely affect the silica hydrogel formation. Molecular sieves available commercially and suitable for use in the present process include the 13X type which is sodium crystalline aluminosilicate, capable of adsorbing molecules whose critical diameter is less than about 10 angstrom units and the 4A type which is sodium crystalline aluminosilicate having channel diameter which will permit adsorption of molecules smaller than about 4 angstrom units.

The sieve material is distributed in the form of a fine powder, generally of a size less than 400 mesh (Tyler) into a silica hydrosol, resulting from reaction of an alkali metal silicate with an acid and a water-soluble alkali metal salt, having the alkalinity, alkali metal salt concentration and silica concentration specified hereinabove. The finely divided sieve material may be added to one of the reactant solutions used in preparing the silica hydrosol or added as an aqueous slurry during the process of forming the silica hydrogel or added, in finely divided solid form, to the previously prepared silica hydrosol prior to gelation thereof. The resulting silica hydrosol containing distributed finely divided molecular sieve is permitted to set to a hydrogel upon passage of a suitable interval of time. The hydrogel composite, so obtained, is thereafter dried, generally under conditions of substantially atmospheric pressure to yield a hard aggregate of finely divided molecular sieve particles bound together by the particularly prepared silica gel.

Alternatively, the same material may be distributed as a powder in a silica hydrosol having a pH in excess of 9.0 and, preferably, between about 10.5 and about 11.5. The resulting silica hydrosol containing powdered molecular sieve is permitted to set to a hydrogel upon passage of a suitable interval of time. The hydrogel is then aged in an aqueous solution of a water-soluble alkali metal salt and subsequently dried and calcined.

The alkali metal silicate reagent used in preparing the siliceous sol in accordance with the described process will generally be sodium silicate. However, it is contemplated that other suitable alkali metal silicates may be likewise employed, such as, for example, potassium silicate. The acid utilized in preparation of the siliceous sol may be any of those acids heretofore employed for this purpose, including both inorganic and organic acids. Representative examples include hydrochloric acid, nitric acid, acetic acid, sulfuric acid, phosphoric acid, etc. Generally, a mineral acid, i.e., nitric, sulfuric, hydrochloric or phosphoric acid is employed and of this group sulfuric acid is preferred. The water-soluble alkali metal salt utilized in preparation of the siliceous sol is one which has been found suitable for effecting rapid gelation of the sol under conditions which would lead to an extremely long time of gelation in the absence of the salt. The presence of the alkali metal salt produces a much firmer and stronger gel product than otherwise would be obtained. Satisfactory salts include water-soluble alkali metal salts of organic and mineral acids. The term mineral acid, as utilized herein, embraces hydrochloric, nitric, sulfuric and phosphoric acids. Suitable representative salts include sodium chloride, lithium chloride, potassium chloride, rubidium chloride, cesium chloride, sodium sulfate, lithium sulfate, potassium sulfate, rubidium sulfate, cesium sulfate, sodium nitrate, lithium nitrate, potassium nitrate, rubidium nitrate, cesium nitrate, sodium acetate, potassium acetate, lithium acetate, rubidium acetate, cesium acetate, sodium citrate, cesium citrate, potassium citrate, lithium citrate, rubidium citrate, sodium formate, potassium formate, lithium formate, rubidium formate, cesium formate, sodium phosphate, potassium phosphate, lithium phosphate, rubidium phosphate and cesium phosphate. Of this group, sodium chloride, due to its low cost and ready availability is accorded preference.

It has been found essential to the success of the present method that the alkalinity and silica concentration of the hydrosol and the presence of the alkali metal salt either during or after formation of the hydrogel be controlled within specified limits in order to achieve the desired hardness in the resulting aggregate product.

Thus, the relative proportions and concentrations of the reagents are controlled such that the resulting sol has a silica concentration of between about 50 and about 300 grams $SiO_2$ per liter and, preferably, between about 50 and about 100 grams $SiO_2$ per liter. It has further been established, as will be evident from data set forth hereinafter, that the hydrosol produced should be alkaline, having a pH in the approximate range of 10.5 to 11.5 and more particularly, characterized by an alkalinity, expressed as the mol ratio of unneutralized alkali metal hydroxide to silica, of between 0.3 and 0.7. Unneutralized alkali metal hydroxide is the total alkali metal hydroxide in the sol minus the amount which has been neutralized by the acid.

The concentration of alkali metal salt in the sol, or in the subsequent ageing solution is, in accordance with the process of this invention, an extremely important and critical factor in obtaining the desired hard aggregate product. It has been found essential that such concentration of alkali metal salt be controlled between about 0.3 and about 3 gram equivalents per liter. The term "gram equivalent," as utilized herein has its usual significance, being that weight of material which will furnish, react with, or displace 1.008 grams of hydrogen. The above concentration of alkali metal salt represents the total alkali metal salt including the salt initially reacted and that formed by neutralization of the alkali metal hydroxide and acid. For example, when sodium silicate, sulfuric acid and sodium chloride are reacted in accordance with the process described herein, the total concentration of alkali metal salt in the resulting hydrosol includes sodium chloride as well as sodium sulfate, formed by the neutralization of sodium hydroxide with sulfuric acid. It is also contemplated that the above specified concentration of alkali metal salt may be obtained entirely from in situ formation, i.e. without further addition of such salt, by reaction of sufficient alkali metal silicate or hydroxide and sufficient acid to furnish the requisite amount of alkali metal salt.

The temperature of the siliceous hydrosol is a further important factor in achieving the desired product. Preferably, the sol forming solutions should be cooled before being combined. The temperature of the resulting sol should desirably be below about 150° F. and, preferably, below about 60° F., but above the freezing point. When the reactant solutions are combined to form the sol, there is a heat of reaction, so that the temperature of the solution should be correspondingly lower than the desired sol temperature.

If the above specifications as regards alkalinity, alkali metal salt concentration and silica concentration are followed, the resulting hydrogels are white and opaque and have been found to form an unusually effective binder for compositing a finely divided molecular sieve material as an aggregate characterized by improved physical properties and, particularly, hardness. On the contrary, if the gel is prepared outside the above ranges, the hydrogel will be translucent or clear and will result after admixture with the molecular sieve in a soft, friable material.

The siliceous hydrogel binder obtained initially contains zeolitic alkali metal due to the use of the alkali metal silicate reagent employed. Thus, when sodium silicate is the reagent employed, the initially formed siliceous gel will contain zeolitic sodium. Such zeolitic alkali metal may be removed from the siliceous gel by base-exchange, i.e. replacement with hydrogen, ammonium, or other metal ion. Such base-exchange is not essential in achieving a hard aggregate product. However, removal of zeolitic alkali metal may be desirable or necessary depending on the application of the product. Thus, where the product is to be used in catalysis either as a catalyst or as a support for an appropriate catalytic agent, it is generally desirable that the product be free of zeolitic alkali metal. Where it is desirable to modify the chemical composition by the introduction of other metal ions, such may be accomplished during replacement of the zeolitic alkali metal with a suitable base-exchange solution, preferably a non-aqueous solution and, particularly, an alcoholic solution containing such other desired metal ion. Where it is not desirable or necessary to introduce another metal ion, the base-exchange solution may be an ammonium salt or an acid.

The resulting molecular sieve-silica gel composite, whether or not it has undergone base-exchange treatment, is thereafter dried generally in air or steam under conditions of substantially atmospheric pressure. The dried composite may be calcined, if desired, depending on the application of the product. Drying is generally carried out at a temperature between about 150° F. and about 350° F. until the product is substantially free of moisture. The calcining operation, when utilized, is ordinarily carried out at a temperature in excess of 350° F., but below 1000° F. The use of temperatures greater than 1000° F. is to be strictly avoided since the crystallinity and porosity of the molecular sieve aggregate under such high temperature conditions is destroyed.

The composites prepared according to this invention contain silica and an amount up to about 90 percent by weight, on a dry basis, of the ultimate composite of an aluminosilicate molecular sieve. The amount of finely divided sieve bound in the form of hard, attrition resistant aggregate, in accordance with the present invention, is generally within the range of about 50 to about 90 weight percent, on a dry basis, of the aggregate product. Preferably, the amount of molecular sieve is between about 70 and about 80 weight percent of the ultimate dry composite. Such composites have, in accordance with the instant invention, been found to be characterized by a maximum hardness.

The method of this invention is adaptable for formation of molecular sieve-silica gel composites, on a batch basis during which the initial hydrogel composite is formed in a mass which is subsequently broken up into pieces or particles of desired size. Alternatively, regularly sized particles of the molecular sieve-silica gel composite may be obtained by tableting, molding, casting or extruding the hydrogel product before drying or after partial removal of water therefrom.

In a preferred embodiment of the invention, the molecular sieve-silica gel composite is initially obtained as spheroidal particles by dispensing the sol containing finely divided sieve in the form of globules into a column of water-immiscible liquid so that spheroidal bead-like particles of hydrogel containing sieve are formed upon gelation. The sol containing dispersed molecular sieve powder prepared in accordance with the present process, having the hereinabove specified characteristics, will not set instantaneously to a gelatinous mass but on the other hand, will set to a hydrogel product upon passage of a suitable interval of time. The time differential may be controlled by variation in the solids content of the composited mixture of molecular sieve and hydrosol, by variation in alkalinity, by variation in the alkali metal salt concentration and by regulation of the temperature of the sol and the water-immiscible liquid into which the hydrosol is introduced. Such time differential permits passing the sol containing finely divided dispersed sieve into a water-immiscible liquid so that the sol may assume a spheroidal shape and set to a hydrogel during passage through the liquid. When the hydrosol mixture is formed into spheroidal particles employing the above technique, the gelation time is suitably less than 20 seconds.

The solution of alkali metal silicate and acid-salt, together with molecular sieve slurry, used in formation of the present hydrosols containing dispersed finely divided molecular sieve are preferably mixed and introduced as globules into the water-immiscible liquid. The water-immiscible liquid may be maintained at a suitable temperature in order to obtain gelation within the desired time. It will accordingly be understood that the time during which the hydrosol product and resulting hydrogel product remain in the water-immiscible liquid and the temperatures of such liquid are correlated to obtain the desired particles and these conditions are inversely related so that if the temperature is increased, the time may be decreased.

Generally, the silica hydrogel-molecular sieve composites prepared by the process described herein are characterized by a gelation time of not more than two hours. Although, it is to be realized that hydrogel composites having a longer time of set when desired may also be produced by the present method. The method of this invention is particularly suitable for the production of hydrogel composites characterized by a time of set in the range of 0.5 to 20 seconds, which hydrogels are capable of being formed into the above-described spheroidal particles upon introducing the hydrosol in the form of globules into a water-immiscible medium and maintaining the hydrosol globules in said medium until they set to globules of hydrogel composites.

While the water-immiscible liquid in which gelation takes place may have a density higher than the siliceous-molecular sieve hydrogel particles in which instance the particles rise upwardly through the liquid, such method is ordinarily less preferred than in the case where the liquid has a lower density, allowing the hydrosol to be introduced at the top of a column thereof and the spheroidal particles formed therein to descend to the bottom of such column. A particularly suitable water-insoluble medium comprises organic liquids, such as kerosene, lubricating oil, gas oils, etc. of such viscosity and density characteristics that the siliceous hydrosol introduced therein in the form of globules will settle at the rate such that the hydrosol binder undergoes gelation forming spheroidal aggregate particles of molecular sieve bound with silica hydrogel during passage through the liquid.

After base exchange of the initially formed silica hydrogel-molecular sieve composites, if such has been employed to remove zeolitic alkali metal, the particles are dried under conditions of substantially atmospheric pressure at a temperature generally from about 150 to about 350° F. and thereafter calcined at a temperature of from about 350 to 1000° F. for 1 to 24 hours or more. Ordinarily, it is preferred to dry the silica gel-molecular sieve particles in air or an atmosphere of superheated steam at a slow rate since such manner of operation has been found to result in less breakage of the particles. The calcination step is ordinarily carried out in air although other inert atmospheres may likewise be used. If desired, the silica gel-molecular sieve particles may be treated with catalytic components prior to the drying and calcining operations and the composites so obtained may then be subjected to the above-described drying and calcining.

The following examples will serve to illustrate the method of the invention without limiting the same:

EXAMPLE 1

Thirty-four and nine tenths (34.9) grams of 4A molecular sieve were degasified by boiling in water for 1 hour and thereafter slurried with 60 cc. of water. The resulting slurry was added to 75 cc. of an aqueous sodium silicate solution containing 14.9 grams $SiO_2$. To such mixture, there was then added an acid-salt solution containing 12 grams NaCl and 2.12 grams of 95.2 weight percent $H_2SO_4$ diluted to a volume of 65 cc. with water. After cooling both solutions to 40° F., the acid-salt solution was added to the sieve-silicate mixture while the latter was rapidly agitated. The resulting mixture was then stirred for about 3 to 4 seconds. A hydrogel formed in about 8 to 10 seconds having a pH of approximately 11. Such hydrogel was permitted to age at room temperature (approximately 70° F.) for about 1 hour. The hydrogel product was thereafter dried in an oven at 250° F. to yield a hard aggregate. X-ray analysis of the aggregate so obtained, after drying, showed little or no loss in sieve crystallinity. If the above prepared aggregate was tempered in air at 1000° F., the crystallinity of the sieve was almost completely destroyed. Without being limited by any theory, such loss in crystallinity is believed to be attributable to the action of excess caustic in the high pH silica gel binder. Attempts to neutralize the caustic by using an aqueous system considerably weakens the aggregate. However, it has been found that if the dried aggregate was treated a number of times with a weak acetic acid-methanol solution until the pH thereof was reduced to 7.5 or below, neutralization of the caustic could be achieved with substantially no reduction in aggregate hardness. Thus, a 70 weight percent 4A sieve–30 weight percent silica aggregate prepared according to the procedure described herein and washed with methanol-acetic acid solution showed no loss in crystallinity or water adsorption capacity. The table below presents the water adsorption capacities in 20 percent relative humidity for aggregates treated in various specified ways:

| Run | Adsorbent | Treatment | Water Adsorption Capacity In 20% Relative Humidity Air wt. |
|---|---|---|---|
| A | 70% wt. 4A sieve and 30% wt. SiO$^2$ Aggregate. | After drying in air at 250° F. and calcined in air at 660° F. | 8.3 |
| B | ----- Do ----- | After drying in air at 250° F.; washing with weak acetic acid-methanol solution until the pH of the aggregate in water reached 7.5; drying in air at 250° F. and calcined in air at 660° F. | 15.5 |
| C | ----- Do ----- | Same as in Run B except that aggregate was washed free of chloride after acetic acid-methanol wash. | 18.3 |
| D | 4A Molecular Sieve | Calcined in air at 660° F. | 26.0 |
| E | Aggregate containing 70% wt. 4A sieve. | Calcined in air at 660° F. (by calculation 26.0×.7=18.2). | 18.2 |

EXAMPLE 2

The following solutions were employed.

Solution A (sodium silicate solution):
  700 grams aqueous sodium silicate containing 28.4 wt. percent $SiO_2$, 8.8 wt. percent $Na_2O$ and 62.8 wt. percent $H_2O$,
  493.5 grams water,
  Specific gravity at 60° F.=1.202.
Solution B (acid salt solution):
  60 grams NaCl (99.9% pure),
  10.3 grams $H_2SO_4$ (97.1% $H_2SO_4$),
  298.1 grams $H_2O$.
Molecular sieve slurry: 38.1 wt. percent of 4A molecular sieve in the form of an aqueous slurry.

One hundred eighty-three and two tenths (183.2) grams of the above aqueous sieve slurry were added to 150 cc. of Solution A. To the resulting mixture, cooled to 38° F., there was added 130 cc. of Solution B also previously cooled at 38° F. An additional 6.6 cc. of water was added to the acid salt solution. The sieve-silicate solution was stirred during the addition of the acid salt solution. The resulting mass set to a gel in about seven seconds. The pH of the gel was 10.9 and the gelation temperature increased to 50° F. After aging at room temperature (approximately 70° F.) for one hour, the hydrogel-sieve aggregate was cut up into small cubes approximately ¼ to ½″. The cubes were then divided into three portions A, B and C which were treated in accordance with the procedures hereinafter set forth.

Portion A was dried at 240° F. for about 16 hours and thereafter calcined at 900° F. for 3 hours utilizing 3 volumes of air per volume of aggregate.

EXAMPLE 3

Portion B was soaked in methanol until the aggregate tested free of chloride ion upon treatment with silver bromide. The resulting product was thereafter dried and calcined as in Example 2.

EXAMPLE 4

Portion C was dried at 240° F. for about 16 hours and then soaked in methanol until free of chloride. The resulting product was thereafter dried and calcined as in Example 2.

EXAMPLE 5

The following solutions were employed.

Solution A (sodium silicate solution):
  700 grams aqueous sodium silicate containing 28.4 wt. percent $SiO_2$, 8.8 wt. percent $Na_2O$ and 62.8 wt. percent $H_2O$,
  493.5 grams water,
  Specific gravity at 60° F.=1.202.
Solution B (acid solution):
  82.4 grams $H_2SO_4$ (97.1% $H_2SO_4$),
  355.5 grams $H_2O$.
Molecular sieve slurry: 38.1 wt. percent of 4A molecular sieve in the form of an aqueous slurry.

One hundred eighty-three and two tenths (183.2) grams of the above aqueous sieve slurry were added to 150 cc. of Solution A. To the resulting mixture, there was added 28 cc. of Solution B plus 30 cc. of water. The resulting mass gelled in about one hour at room temperature (approximately 70° F.) and was allowed to age overnight (about 16 hours) before being divided into two portions.

One portion was soaked in an aqueous sodium chloride solution containing 60 grams NaCl in 200 cc. of water for about 64 hours. The resulting product was then dried at 240° F. for about 16 hours and thereafter calcined at 900° F. for 3 hours in air.

EXAMPLE 6

The second portion of the sieve-hydrogel aggregate prepared according to Example 5 was dried and calcined directly, i.e. without intermediate soaking in sodium chloride solution, under the conditions specified in Example 5.

EXAMPLE 7

The following solutions were employed.
Solution A (sodium silicate solution):
  500 grams of aqueous sodium silicate containing 28.7 wt. percent $SiO_2$, 8.9 wt. percent $Na_2O$, and 62.4 wt. percent $H_2O$,
  500 grams water.
Solution B (acid solution):
  82.4 grams $H_2SO_4$ (97.1% $H_2SO_4$),
  355.5 grams $H_2O$.
Molecular sieve slurry: 38.1 wt. percent of 4A molecular sieve in the form of an aqueous slurry.

One hundred twelve (112) grams of the above aqueous sieve slurry were added to 200 grams of Solution A, previously cooled to about 35° F. The mixture was added to 106.4 grams of Solution B also previously cooled to about 35° F. The resulting mass having a pH of approximately 5.9 gelled in about 200 seconds. After aging for one hour at room temperature (approximately 70° F.), the hydrogel-sieve aggregate was divided into three portions for further treatment.

One portion was dried at 240° F. in an oven for about 16 hours.

EXAMPLE 8

A second portion of the hydrogel-sieve aggregate prepared in Example 7 was soaked in an aqueous sodium chloride solution containing 22.9 grams NaCl and 60 cc. of water for 18 hours and thereafter dried in an oven at 240° F. for about 16 hours.

EXAMPLE 9

The third portion of the hydrogel-sieve aggregate prepared in Example 7 was water washed free of sulfate ion and thereafter dried at 240° F. for about 16 hours.

EXAMPLE 10

The reactant solutions used in preparation of the aggregate product of this example were the same as those employed in Example 7.

One hundred twelve (112) grams of the aqueous sieve slurry were added to 200 grams of Solution A, previously cooled to about 35° F. The mixture was added to a second mixture also previously cooled to about 35° F. and containing 106.4 grams of Solution B, 22.9 grams of NaCl, and 50 grams of additional water. The resulting mass having a pH of approximately 5.8 set to a hydrogel in about 305 seconds. After aging the resulting hydrogel-sieve aggregate for one hour at room temperature (about 70° F.), the product was cut into ½" cubes and divided into two portions.

One portion was dried at 240° F. for about 16 hours.

EXAMPLE 11

A second portion of the hydrogel-sieve aggregate prepared in Example 10 was water washed free of chloride and sulfate ions and thereafter dried as in Example 10.

The aggregate products of Examples 2–11 were tested for hardness in a standard test known as the 8-ball index test. Such test involves:

Fifty (50) cc. of a finely pulverized sample, through 3 on 8 mesh (Tyler), is weighed and placed in a metal attrition can 3⅜" in diameter and 4⅜" high along with 8 stainless steel balls of $^{15}\!/_{16}$" in diameter weighing 55±.5 grams each. The can is thereafter closed with a metal lid and rotated for one hour at a speed of 80±2 r.p.m. At the end of such time, the sample is removed from the can and the weight of the sample which is retained on a 10 mesh (Tyler) screen divided by the weight of the original sample is the 8-ball index. The higher the value of this index, the more attrition resistance in the sample.

The 8-ball indices for each of the aggregate products of Examples 2–11 are set forth in Table I below:

*Table I*

| Example | Gelling Agent | Gel pH | Treatment Sequence | 8-Ball Index, percent |
|---|---|---|---|---|
| 2 | $H_2SO_4$+NaCl | 10.9 | Dried, calcined | 76 |
| 3 | $H_2SO_4$+NaCl | 10.9 | Methanol wash, dried, calcined | 0 |
| 4 | $H_2SO_4$+NaCl | 10.9 | Dried, methanol wash, dried, calcined | 77 |
| 5 | $H_2SO_4$ | 11.0 | Sodium chloride soak, dried, calcined | 61 |
| 6 | $H_2SO_4$ | 11.0 | Dried, calcined | 31 |
| 7 | $H_2SO_4$ | 5.9 | Dried | 0 |
| 8 | $H_2SO_4$ | 5.9 | Sodium chloride soak, dried | 0 |
| 9 | $H_2SO_4$ | 5.9 | Water wash, dried | 0 |
| 10 | $H_2SO_4$NaCl | 5.8 | Dried | 0 |
| 11 | $H_2SO_4$NaCl | 5.8 | Water wash, dried | 0 |

It will be seen from the foregoing data that both high pH and the presence of an alkali metal salt, either in the gelling solution or in a soaking solution after gelation are essential in achievement of hard aggregates. It is further to be noted that gelling in the presence of the alkali metal salt affords an aggregate with a greater hardness, i.e. a higher 8-ball index than when the aggregate is soaked in an aqueous solution of the alkali metal salt after gelation. It will further be seen that it is essential that the highly alkaline silica hydrogel be in contact with the alkali metal salt solution prior to removal of water therefrom. Thus, it will be evident from a comparison of the results of Examples 3 and 4 that removal of the alkali metal salt, i.e. sodium chloride from the aggregate with a methanol wash can be carried out without causing degradation of the product only if the methanol wash follows the drying step. The low pH silica gel binder was, as will be noted, not effective regardless of subsequent treatment.

I claim:

1. A method for producing a molecular sieve composite which comprises distributing a crystalline aluminosilicate molecular sieve in finely divided form and in an amount between about 50 percent and about 90 percent by weight of the total solids, on a dry basis, of the ultimate composite in a siliceous hydrosol prepared by reaction of an alkali metal silicate with an acid and a water-soluble alkali metal salt to form a siliceous hydrosol characterized by an alkalinity expressed as the mol ratio of unneutralized alkali metal hydroxide to silica of between 0.3 and 0.7, an alkali metal salt concentration of between about 0.3 and about 3 gram equivalents per liter and a silica concentration of between about 50 and about 300 grams $SiO_2$ per liter of hydrosol, permitting the resulting composited hydrosol to set to a hydrogel and thereafter removing water from said hydrogel at a temperature not exceeding 1000° F.

2. A method for producing a molecular sieve composite which comprises distributing a crystalline aluminosilicate molecular sieve in finely divided form and in an amount between about 50 percent and about 90 percent by weight of the total solids, on a dry basis, of the ultimate composite in a siliceous hydrosol prepared by reaction of an alkali metal silicate with an acid to form a siliceous hydrosol characterized by an alkalinity, expressed as the mol ratio of unneutralized alkali metal hydroxide to silica of between 0.3 and 0.7 and a silica concentration of between about 50 and about 300 grams $SiO_2$ per liter of hydrosol, permitting the resulting composited hydrosol to set to a hydrogel, aging the hydrogel so obtained in an aqueous solution of a water-soluble alkali metal salt containing between about 0.3 and about 3 gram equivalents per liter for a period of between about 1 and about 24 hours at a temperature between about 32 and about 200° F. and thereafter drying and calcining at a temperature not exceeding 1000° F.

3. A method for producing a molecular sieve composite which comprises distributing a crystalline aluminosilicate sieve having uniform pore openings of between about 4 and about 15 angstroms in finely divided form and in an amount between about 50 percent and about 90 percent by weight of the total solids, on a dry basis, of the ultimate composite in a siliceous hydrosol prepared by reaction of an alkali metal silicate with an acid and a water-soluble alkali metal salt to form a silica hydrosol characterized by a pH in the approximate range of 10.5 to 11.5, an alkali metal salt concentration of between about 0.3 and about 3 gram equivalents per liter and a silica concentration of between about 50 and about 300 grams $SiO_2$ per liter of hydrosol, permitting the resulting compositing hydrosol to set to a hydrogel and thereafter removing water from said hydrogel at a temperature not exceeding 1000° F.

4. A method for producing molecular sieve composite which comprises distributing a crystalline aluminosilicate molecular sieve having pore openings of about 4 and 15 angstroms in finely divided form and in an amount of between about 50 and 90 percent by weight of the total solids, on a dry basis, of the ultimate composite in a siliceous hydrosol prepared by reaction of an alkali metal silicate with an acid to form a siliceous hydrosol characterized by a pH in the approximate range of 10.5 to 11.5 and a silica concentration of between 50 and 300 grams $SiO_2$ per liter of hydrosol, permitting the resulting composite hydrosol to set to a hydrogel, ageing the hydrogel so obtained in an aqueous solution of a water soluble alkali metal salt containing 0.3 and about 3 gram equivalents per liter for a period of between 1 and about 24 hours at a temperature between 32 and 200° F. and thereafter drying and calcining at a temperature not exceeding 1000° F.

5. A method for producing a molecular sieve composite which comprises combining with a siliceous hydrosol a crystalline metal aluminosilicate molecular sieve characterized by an effective pore diameter of between about 4 and about 15 angstroms and wherein said metal is selected from the group consisting of an alkali metal and an alkaline earth metal, said sieve being distributed in finely divided form and in an amount of approximately 50 percent and about 90 percent by weight of the total solids, on a dry basis, of the ultimate composite in said hydrosol prepared by reaction of an alkali metal silicate with an acid and sodium chloride to form a siliceous hydrosol characterized by an alkalinity, expressed as the mol ratio of unneutralized alkali metal hydroxide to silica of between 0.3 and 0.7, an alkali metal salt concentration of between about 0.3 and about 3 gram equivalents per liter and a silica concentration of between about 50 and 300 grams $SiO_2$ per liter of hydrosol permitting the resulting composited hydrosol to set to a hydrogel and thereafter removing water from said hydrogel at a temperature not exceeding 1000° F.

6. A method for producing a molecular sieve composite which comprises combining with a siliceous hydrosol a crystalline metal aluminosilicate molecular sieve characterized by an effective pore diameter of between about 4 and about 15 angstroms and wherein said metal is selected from the group consisting of an alkali metal and an alkaline earth metal, said sieve being distributed in finely divided form and in an amount of approximately 50 percent and about 90 percent by weight of the total solids, on a dry basis, of the ultimate composite in said hydrosol prepared by reaction of an alkali metal silicate with an acid to form a siliceous hydrosol characterized by an alkalinity, expressed as the mol ratio of unneutralized alkali metal hydroxide to silica of between 0.3 and 0.7 and a silica concentration of between about 50 and 300 grams $SiO_2$ per liter of hydrosol, permitting the resulting composited hydrosol to set to a hydrogel, ageing the hydrogel so obtained in an aqueous solution containing between about 0.3 and 3 gram equivalents per liter of sodium chloride for a period of between 1 and about 24 hours at a temperature between 32 and 200° F. and thereafter drying and calcining at a temperature not exceeding 1000° F.

7. In a method for producing a molecular sieve composite by distributing an aluminosilicate molecular sieve in a siliceous hydrosol, having a pH in excess of 9, prepared by reaction of an alkali metal silicate with an acid and wherein said hydrosol sets to a hydrogel and is subsequently dried with removal of water therefrom, the improvement which comprises contacting a material selected from the group consisting of said hydrosol and said hydrogel with a water-soluble alkali metal salt solution containing between about 0.3 and about 3 gram equivalents per liter for a period of between about 1 and about 24 hours at a temperature between about 32 and about 200° F. prior to said removal of water.

8. A method for producing a molecular sieve composite which comprises distributing an aluminosilicate molecular sieve in a siliceous hydrosol prepared by reaction of an alkali metal silicate with an acid and a water-soluble alkali metal salt and characterized by a pH in the approximate range of 10.5 to 11.5, permitting the resulting composited hydrosol to set to a hydrogel and effecting removal of water from said hydrogel.

9. In a method for producing a molecular sieve composite by distributing an aluminosilicate molecular sieve in an amount corresponding to a major portion, on a dry basis, of the ultimate product, in a siliceous hydrosol, having a pH in excess of 9, prepared by reaction of an alkali metal silicate with an acid and wherein said hydrosol sets to a hydrogel and is subsequently dried with removal of water therefrom, the improvement which comprises contacting a material selected from the group consisting of said hydrosol and said hydrogel with a water-soluble alkali metal salt solution containing between about 0.3 and about 3 gram equivalents per liter for a period of between about 1 and about 24 hours at a temperature between about 32 and about 200° F. prior to said removal of water.

References Cited by the Examiner

UNITED STATES PATENTS

| | | | |
|---|---|---|---|
| 2,462,236 | 2/49 | Thomas | 252—451 |
| 2,865,867 | 12/58 | Van Dyke | 252—455 |
| 2,962,435 | 11/60 | Fleck et al. | 252—455 |
| 2,973,327 | 2/61 | Mitchell | 252—449 |
| 3,006,153 | 10/61 | Cook | 252—455 |

MAURICE A. BRINDISI, *Primary Examiner.*